Patented Sept. 26, 1944

2,358,986

UNITED STATES PATENT OFFICE 2,358,986

COMBINED INSECTICIDE AND GERMICIDE

Edward R. McGovran, Hyattsville, and Lyle D. Goodhue, Berwyn Heights, Md., assignors to Claude R. Wickard, as Secretary of Agriculture of the United States of America, and his successors in office No Drawing. Application April 14, 1943, Serial No. 483,000

2 Claims. (Cl. 167—39)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a composition containing an insecticide and a germicide which will be dispersed in aerosol form when the composition is released from a suitable dispenser, and has among its objects: the provision of a combined insecticidal and germicidal aerosol; one which is non-toxic to animals and, therefore, can be safely used in such places as hospitals, public conveyances, dwellings, and dairy barns without the need for evacuation of the occupants; the provision of an aerosol of the above nature which is also non-combustible, to remove the risk of fire during use; and such other objects as will be apparent from the following description and appended claims. The subject-matter is related to that disclosed in the copending application of Goodhue et al., Serial No. 404,520, filed July 29, 1941, and granted June 8, 1943, Patent No. 2,321,023.

The invention comprises, in general, a combination of a suitable insecticide and germicide as the active ingredients, dissolved in a liquid-dispersing agent, which is non-toxic to man or animal, and which may be sprayed or released from a suitable container to cause dispersion of the active ingredients in aerosol form. If the particular dispersing agent used is not a solvent for both the insecticide and germicide selected, a mutual solvent which is also soluble in the dispersing agent is added. In some instances addition of an oil, which acts as a carrier or conditioner for the insecticide, is desirable.

The dispersing agent is of such nature that it is gaseous at normal temperatures and pressures but can be easily maintained in a pressure container and, when released as a spray in the air, the droplets evaporate violently, thus shattering them. The other ingredients of the composition being relatively non-volatile, that is, sufficiently non-volatile, that they do not evaporate along with the dispersing agent, are left suspended in the air in very minute particles, known as an aerosol form. The mutual solvent, if one be used, may be either relatively non-volatile or quite volatile, as it is immaterial whether it remain in the atmosphere as an aerosol or vapor. The conditioner-material must, however, be relatively non-volatile, as it functions to modify the size of the aerosol particles of insecticide and to give them added insect-penetrating properties.

Suitable insecticides for the purposes of the invention comprise such materials as pyrethrum, rotenone-bearing plant extracts, and nicotine, with or without a synergist, such as sesame oil. These may be combined with germicides, such as carbolic acid, resorcinol, hexylresorcinol, propylene glycol, phenol, and thymol. Suitable dispersing agents comprise liquefied gases such as dichlorodifluoromethane, methyl chloride, carbon dioxide, nitrous oxide, dimethyl ether, and various hydrocarbons, with a mutual solvent for the insecticide and germicide when required. Such materials as ethanol, acetone, diacetone alcohol, methyl ethyl ketone, and methyl hexyl ketone, are suitable mutual solvents. When desirable, carrier or conditioner-materials, such as olive oil, deodorized kerosene, refined cottonseed oil, or other relatively non-volatile materials, are added.

The proportions used in compounding the various ingredients are not critical, except that the relatively non-volatile ingredients should not be in quantity sufficient to prevent the rapid evaporation of the dispersing agent. If the dispersing agent does not evaporate rapidly, the resulting spray is merely a wet spray with slow evaporation of the dispersing agent, resulting in rapid settling of the spray droplets, and, after the dispersing agent has evaporated, the remaining particles of relatively non-volatile ingredients are large. Although the permissible range of relatively non-volatile ingredients is not sharply defined, these ingredients should be so proportioned relative to the dispersing agent that when the composition is sprayed into air under normal conditions of temperature and pressure, the dispersing agent will evaporate rapidly in the droplets, leaving the active ingredients suspended in aerosol form. Usually the relatively non-volatile ingredients should not be substantially in excess of 20 percent of the composition.

The particular insecticide and germicide used must be compatible with each other, that is, they must not be such as to destroy their lethal action by their mutual presence. They must also be compatible with the other ingredients, and must be relatively non-volatile.

The following examples are illustrative of specific compositions in preferable forms:

*Example I*

A mixture of from about 2 percent to 18 percent pyrethrum extract (20 percent pyrethrins), from about 2 percent to 18 percent propylene glycol, and from about 10 percent to 30 percent ethanol, dissolved in liquid dichlorodifluoromethane (total relatively non-volatile ingredients not substantially in excess of 20 percent), is readily dispersed and leaves the active ingredients in aerosol form, with very good lethal effect on both insects and bacteria in the air, reducing the number of bacteria in a treated space by from about 90 percent to 96 percent.

Example II

A mixture of from about 2 percent to 20 percent pyrethrum extract (20 percent pyrethrins), from about 0.1 percent to 1.0 percent hexylresorcinol, and from about 1 percent to 10 percent olive oil, dissolved in liquid dichlorodifluoromethane (total relatively non-volatile ingredients not substantially in excess of 20 percent), is also an excellent composition for the purpose described, reducing the number of bacteria in a treated space by from about 90 percent to 99 percent.

Both compositions of Examples I and II are non-toxic to man and animal and are non-combustible.

Having thus described the invention, what is claimed is:

1. A composition containing a relatively non-volatile insecticide and olive oil for modifying the size of aerosol particles of the insecticide and to give them added insect-penetrating properties, said insecticide and olive oil being dissolved in a compressed liquid-dispersing agent which is gaseous under conditions of normal pressure and temperature, the proportions of ingredients being such that, when the composition is sprayed in the air, the dispersing agent quickly evaporates, leaving the insecticide suspended in aerosol form.

2. A composition containing from about 2 percent to 18 percent pyrethrum extract and from about 2 percent to 18 percent propylene glycol, and a mutual solvent, dissolved in liquid dichlorodifluoromethane, the percentage of relatively non-volatile ingredients not being substantially in excess of 20 percent.

EDWARD R. McGOVRAN.
LYLE D. GOODHUE.